US012519660B2

(12) United States Patent
Rajput et al.

(10) Patent No.: US 12,519,660 B2
(45) Date of Patent: Jan. 6, 2026

(54) METHODS, SYSTEMS, AND COMPUTER READABLE MEDIA FOR PROTECTING AGAINST UNAUTHORIZED USE OF CERTIFICATE MANAGEMENT PROTOCOL (CMP) CLIENT IDENTITY PRIVATE KEYS AND PUBLIC KEY CERTIFICATES ASSOCIATED WITH NETWORK FUNCTIONS

(71) Applicant: Oracle International Corporation, Redwood Shores, CA (US)

(72) Inventors: Jay Rajput, Bangalore (IN); Virendra Singh, Bangalore (IN); Pavani Chirala, Sadananda Nagar (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 278 days.

(21) Appl. No.: 18/113,041

(22) Filed: Feb. 22, 2023

(65) Prior Publication Data
US 2024/0283661 A1    Aug. 22, 2024

(51) Int. Cl.
*H04L 9/32* (2006.01)

(52) U.S. Cl.
CPC .......... *H04L 9/3268* (2013.01); *H04L 9/3213* (2013.01)

(58) Field of Classification Search
CPC ............................ H04L 9/3268; H04L 9/3213
See application file for complete search history.

(56) References Cited

U.S. PATENT DOCUMENTS 9,331,990 B2    5/2016  Le Saint
10,075,435 B1   9/2018  Byrd et al.
(Continued)

FOREIGN PATENT DOCUMENTS

WO    WO-2021008716 A1 *  1/2021  .......... H04W 12/069
WO    WO-2021099675 A1 *  5/2021  ............. H04L 67/59
(Continued)

OTHER PUBLICATIONS

Hardt, "The OAuth 2.0 Authorization Framework", Internet Engineering Task Force (IETF), RFC 6749, pp. 1-76 (Oct. 2012).
(Continued)

*Primary Examiner* — Darshan I Dhruv
(74) *Attorney, Agent, or Firm* — Jenkins, Taylor & Hunt, P.A.

(57) ABSTRACT

A method for protecting against unauthorized use of CMP client identity private keys and CMP public key certificates associated with NFs includes receiving, by a CMP CA proxy, a first CMP certificate request for renewing a security certificate associated with a first NF, the CMP certificate request including a public key certificate associated with the first NF and is protected by a CMP client identity private key associated with the first NF. The method further includes determining that the first NF is registered with the NRF, and, in response to determining that the first NF is registered with the NRF, checking, by the CMP CA proxy whether the first CMP certificate request includes an NRF-issued access token for the first NF, determining that the CMP certificate request does not include the NRF-issued access token for the first NF, and, in response to determining that the first CMP certificate request does not include the NRF-issued access token for the first NF, performing a network security action regarding the first CMP certificate request.

14 Claims, 11 Drawing Sheets

(56) References Cited

U.S. PATENT DOCUMENTS

| | | | |
|---|---|---|---|
| 10,903,999 | B1 | 1/2021 | Raman et al. |
| 11,522,721 | B2 * | 12/2022 | Choyi .................. H04L 9/0643 |
| 2021/0288802 | A1 * | 9/2021 | Muhanna ............. H04L 9/3263 |
| 2021/0314171 | A1 * | 10/2021 | Choyi .................. H04L 9/3247 |
| 2021/0377053 | A1 * | 12/2021 | Mahajan ............ H04W 12/069 |
| 2021/0377054 | A1 * | 12/2021 | Mahajan ................ G06F 9/455 |
| 2022/0086734 | A1 | 3/2022 | Aggarwal et al. |
| 2022/0210624 | A1 | 6/2022 | Ping et al. |
| 2022/0345486 | A1 | 10/2022 | Rajput et al. |
| 2023/0064698 | A1 | 3/2023 | Choyi et al. |
| 2023/0412396 | A1 * | 12/2023 | Bommisetty ......... H04L 9/3073 |
| 2024/0121111 | A1 * | 4/2024 | Gomez .............. H04W 12/069 |
| 2024/0414144 | A1 | 12/2024 | Chirala et al. |

FOREIGN PATENT DOCUMENTS

| | | | | |
|---|---|---|---|---|
| WO | WO-2023242058 | A1 * | 12/2023 | .......... H04L 9/3268 |
| WO | WO-2024094319 | A1 * | 5/2024 | .......... H04W 12/069 |

OTHER PUBLICATIONS

"3rd Generation Partnership Project; Technical Specification Group Services and System Aspects; Security architecture and procedures for 5G system (Release 17)", 3GPP TS 33.501, V17.8.0, pp. 1-292 (Dec. 2022).

"3rd Generation Partnership Project; Technical Specification Group Core Network and Terminals; 5G System; Network Function Repository Services; Stage 3 (Release 18)", 3GPP TS 29.510, V18.1.0, pp. 1-330 (Dec. 2022).

"3rd Generation Partnership Project; Technical Specification Group Core Network and Terminals; 5G System; Principles and Guideline for Services Definition; Stage 3 (Release 18)", 3GPP TS 29.501, V18.0.0, pp. 1-83 (Dec. 2022).

"3rd Generation Partnership Project; Technical Specification Group Core Network and Terminals; 5G System; Technical Realization of Service Based Architecture; Stage 3 (Release 18)", 3GPP TS 29.500, V18.0.0, pp. 1-131 (Dec. 2022).

"3rd Generation Partnership Project; Technical Specification Group Core Network and Terminals; 5G System; Network Function Repository Services; Stage 3 (Release 17)", 3GPP TS 29.510, V17.5.0, pp. 1-298 (Mar. 2022).

"3rd Generation Partnership Project; Technical Specification Group Services and System Aspects; Security architecture and procedures for 5G system (Release 17)", 3GPP TS 33.501, V17.7.0, pp. 1-292 (Sep. 2022).

"3rd Generation Partnership Project; Technical Specification Group Core Network and Terminals; 5G System; Principles and Guideline for Services Definition; Stage 3 (Release 17)", 3GPP TS 29.501, V17.7.0, pp. 1-81 (Sep. 2022).

"3rd Generation Partnership Project; Technical Specification Group Core Network and Terminals; 5G System; Technical Realization of Service Based Architecture; Stage 3 (Release 17)", 3GPP TS 29.500, V17.8.0, pp. 1-131 (Sep. 2022).

"3rd Generation Partnership Project; Technical Specification Group Services and System Aspects; Procedures for the 5G System (5GS); Stage 2 (Release 17)", 3GPP TS 23.502, V17.6.0, pp. 1-748 (Sep. 2022).

3rd Generation Partnership Project; Technical Specification Group Services and System Aspects; Security architecture and procedures for 5G system (5GS); Stage 2 (Release 17), 3GPP TS 23.501, V17.6.0, pp. 1-571 (Sep. 2022).

3rd Generation Partnership Project; Technical Specification Group Services and System Aspects; Network Domain Security (NDS); Authentication Framework (AF) (Release 18) 3GPP TS 33.310 V18.0.0 pp. 1-61 (Mar. 2023).

3rd Generation Partnership Project; Technical Specification Group Services and System Aspects; Security architecture and procedures for 5G system (Release 18) 3GPP TS 33.501 V18.0.0 pp. 1-252 (Dec. 2022).

Commonly-Assigned, co-pending U.S. Appl. No. 18/207,117 for Methods, Systems, and Computer Readable Media for Automatically Binding a Service-Based Interface (SBI) Communications Digital Certificate Lifecycle To a Network Function (NF) Lifecycle (Unpublished, filed Jun. 7, 2023).

Cooper, et al., "Internet X.509 Public Key Infrastructure Certificate and Certificate Revocation List (CRL) Profile", IETF RFC 5280 (May 2008).

Adams, et al., "Internet X.509 Public Key Infrastructure Certificate Management Protocol (CMP)", IETF RFC 4210 (Sep. 2005).

Notification of Transmittal of the International Search Report and the Written Opinion of the International Searching Authority, or the Declaration for International Patent Application Serial No. PCT/US2024/013622 (May 3, 2024).

Non-Final Office Action for U.S. Appl. No. 18/207,117 (Mar. 20, 2025).

Final Office Action for U.S. Appl. No. 18/207,117 (Aug. 1, 2025).

Advisory Action for U.S. Appl. No. 18/207,117 (Nov. 10, 2025).

* cited by examiner

METHODS, SYSTEMS, AND COMPUTER READABLE MEDIA FOR PROTECTING AGAINST UNAUTHORIZED USE OF CERTIFICATE MANAGEMENT PROTOCOL (CMP) CLIENT IDENTITY PRIVATE KEYS AND PUBLIC KEY CERTIFICATES ASSOCIATED WITH NETWORK FUNCTIONS

TECHNICAL FIELD

The subject matter described herein relates to protecting against unauthorize use of credentials that can be used to impersonate network functions (NFs), such as 5G NFs in a 5G network. More particularly, the subject matter described herein relates to methods, systems, and computer readable media for protecting against unauthorized use of CMP client identity private keys and public key certificates associated with NFs.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G and other types of networks is that NF client identity private keys and public key certificates can be stolen and used without authorization to obtain a transport layer security (TLS) certificate of an NF. The TLS certificate of an NF includes NF instance ID of the NF in the subject alternate name of the TLS certificate. The TLS certificate can then be used to impersonate the NF and perform malicious actions in the network.

The Third Generation Partnership Project (3GPP) specifies usage of a certificate management protocol (CMP) for automatic certificate management. CMP messages are protected using a CMP client private key and a public key certificate, which may be manually configured on a certificate manager (CM) by the network operator. If the CMP client private key and the CMP public key certificate are stolen, a hacker can successfully obtain a TLS certificate for a registered NF and use the TLS certificate to impersonate the NF and perform malicious actions in the network.

Accordingly, in light of these and other difficulties, there exists a need to protect against unauthorized use of a CMP client identity private key and public key certificate to prevent a hacker from obtaining and using an NF TLS certificate.

SUMMARY

A method for protecting against unauthorized use of certificate management protocol (CMP) client identity private keys and CMP public key certificates associated with network functions (NFs) includes receiving, by a CMP certificate authority (CA) proxy, a first CMP certificate request for renewing a security certificate associated with a first NF, the CMP certificate request including a public key certificate associated with the first NF and is protected by a CMP client identity private key associated with the first NF. The method further includes checking, by the CMP CA proxy, whether the first NF is registered with an NF repository function (NRF) and determining that the first NF is registered with the NRF. The method further includes, in response to determining, by the CMP CA proxy that the first NF is registered with the NRF, checking, by the CMP CA proxy whether the first CMP certificate request includes an NRF-issued access token for the first NF and determining that the CMP certificate request does not include the NRF-issued access token for the first NF. The method further includes, in response to determining, by the CMP CA proxy, that the first CMP certificate request does not include the NRF-issued access token for the first NF, performing a network security action regarding the first CMP certificate request.

According to another aspect of the subject matter described herein, receiving the first CMP certificate request includes receiving the first CMP certificate request from a hacker impersonating the first NF.

According to another aspect of the subject matter described herein, performing a network security action for the first CMP certificate request includes preventing a CMP CA from providing the security certificate to the hacker.

According to another aspect of the subject matter described herein, preventing the CMP CA from providing the security certificate to the hacker includes blocking the first CMP certificate request from reaching the CMP CA.

According to another aspect of the subject matter described herein, receiving the first CMP certificate request at a CMP CA proxy includes receiving the first CMP certificate request at a CMP CA proxy that is a component of the NRF or at a CMP CA proxy that is separate from the NRF.

According to another aspect of the subject matter described herein, receiving the first CMP certificate request includes intercepting the first CMP certificate request.

According to another aspect of the subject matter described herein, receiving the first CMP certificate request includes receiving a first CMP certificate request for a transport layer security (TLS) or a client credentials assertion (CCA) certificate of the first NF.

According to another aspect of the subject matter described herein, checking whether the first CMP certificate request includes the NRF-issued access token for the first NF includes checking whether the first CMP request includes an OAuth 2.0 access token issued by the NRF to the first NF.

According to another aspect of the subject matter described herein, the method for protecting against unauthorized use of CMP client identity private keys and CMP public key certificates associated NFs includes receiving, by the CMP CA proxy, a second CMP certificate request for renewing a security certificate associated with a second NF, the request including a public key certificate associated with the second NF and is protected by a CMP client identity private key associated with the second NF. The method further includes checking, by the CMP CA proxy, whether the second NF is registered with the NRF and determining that the second NF is not registered with the NRF. The method further includes, in response to determining that the second NF is not registered with the NRF, allowing processing of the second CMP certificate request by forwarding the second CMP certificate request to the CMP CA. The method for protecting against unauthorized use of CMP client identity private keys and CMP public key certificates associated NFs includes, at the CMP CA, generating a CMP certificate response including the security certificate associated with the second NF and forwarding the CMP certificate response to an originator of the second CMP certificate request.

According to another aspect of the subject matter described herein, the method for protecting against unauthorized use of CMP client identity private keys and CMP public key certificates associated with NFs includes transmitting, by a second NF and to the CMP CA proxy, a second CMP certificate request for renewing a second security certificate associated with the second NF, the second CMP certificate request including a public key certificate, is protected by a CMP client identity private key associated with the second NF, and includes an NRF-issued access token associated with the second NF, receiving, by the CMP CA proxy, the second CMP certificate request, checking, by the CMP CA proxy, whether the second NF is registered with the NRF and determining that the second NF is registered with the NRF, in response to determining, by the CMP CA proxy that the second NF is registered with the NRF, checking, by the CMP CA proxy whether the second CMP certificate request includes the NRF-issued access token associated with the second NF and determining that the second CMP certificate request includes the NRF-issued access token associated with the second NF, and in response to determining, by the CMP CA proxy, that the second CMP certificate request includes the NRF-issued access token associated with the second NF, allowing processing of the second CMP certificate request by forwarding the second CMP certificate request to a CMP CA proxy.

According to another aspect of the subject matter described herein, a system for protecting against unauthorized use of CMP client identity private keys and CMP public key certificates associated with NFs. The system includes a CMP CA proxy including at least one processor and a memory. The system further includes a CMP certificate request validator implemented by the at least one processor for receiving a first CMP certificate request for renewing a security certificate associated with a first NF, the CMP certificate request including a public key certificate associated with the first NF and is protected by a CMP client identity private key associated with the first NF, checking, whether the first NF is registered with an NF repository function (NRF) and determining that the first NF is registered with the NRF, in response to determining that the first NF is registered with the NRF, checking whether the first CMP certificate request includes an NRF-issued access token for the first NF and determining that the CMP certificate request does not include the NRF-issued access token for the first NF, and, in response to determining that the first CMP certificate request does not include the NRF-issued access token for the first NF, performing a network security action regarding the first CMP certificate request.

According to another aspect of the subject matter described herein, the first CMP certificate request originates from a hacker impersonating the first NF.

According to another aspect of the subject matter described herein, in performing a network security action for the first CMP certificate request, the CMP certificate request validator is configured to prevent a CMP CA from providing the security certificate to the hacker by blocking the first CMP certificate request from reaching the CMP CA.

According to another aspect of the subject matter described herein, the CMP CA proxy comprises a component of the NRF or is separate from the NRF.

According to another aspect of the subject matter described herein, the CMP certificate request validator is configured to receive the first CMP certificate request by intercepting the first CMP certificate request.

According to another aspect of the subject matter described herein, the security certificate comprises a transport layer security (TLS) or a client credentials assertion (CCA) certificate of the first NF.

According to another aspect of the subject matter described herein, the NRF-issued access token for the first NF includes comprises an OAuth 2.0 access token issued by the NRF to the first NF.

According to another aspect of the subject matter described herein, the CMP certificate request validator is configured to receive a second CMP certificate request for renewing a security certificate associated with a second NF, the request including a public key certificate associated with the second NF and is protected by a CMP client identity private key associated with the second NF. The CMP certificate request validator is further configured to check whether the second NF is registered with the NRF and determine that the second NF is not registered with the NRF.

The CMP certificate request validator is further configured to, in response to determining that the second NF is not registered with the NRF, allow processing of the second CMP certificate request by forwarding the second CMP certificate request to the CMP CA.

According to another aspect of the subject matter described herein, the system for protecting against CMP client identity private keys and CMP public key certificates includes a second MF for transmitting, to the CMP CA proxy, a second CMP certificate request for renewing a second security certificate associated with the second NF, the second CMP certificate request including a public key certificate associated with the second NF, is protected by a CMP client identity private key associated with the second NF, and includes an NRF-issued access token associated with the second NF. The CMP certificate request validator is configured to receive the second CMP certificate request, check whether the second NF is registered with the NRF and determining that the second NF is registered with the NRF, in response to determining, that the second NF is registered with the NRF, check whether the second CMP certificate request includes the NRF-issued access token associated with the second NF and determine that the second CMP certificate request includes the NRF-issued access token associated with the second NF, and, in response to determining that the second CMP certificate request includes the NRF-issued access token associated with the second the second NF, allowing processing of the second CMP certificate request by forwarding the second CMP certificate request to the CMP CA.

According to another aspect of the subject matter described herein, a non-transitory computer readable medium having stored thereon executable instructions that when executed by a processor of a computer control the computer to perform steps is provided. The steps include receiving, by a certificate management protocol (CMP) certificate authority (CA) proxy, a first CMP certificate request for renewing a security certificate associated with a first network function (NF), the CMP certificate request a public key certificate associated with the first NF and is protected by a CMP client identity private key associated with the first NF. The steps further include checking, by the CMP CA proxy, whether the first NF is registered with an NF repository function (NRF) and determining that the first NF is registered with the NRF. The steps further include, in response to determining, by the CMP CA proxy that the first NF is registered with the NRF, checking, by the CMP CA proxy whether the first CMP certificate request includes an NRF-issued access token for the first NF and determining that the CMP certificate request does not include the NRF-issued access token for the first NF. The steps further include, in response to determining, by the CMP CA proxy, that the first CMP certificate request does not include the NRF-issued access token for the first NF, performing a network security action regarding the first CMP certificate request.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
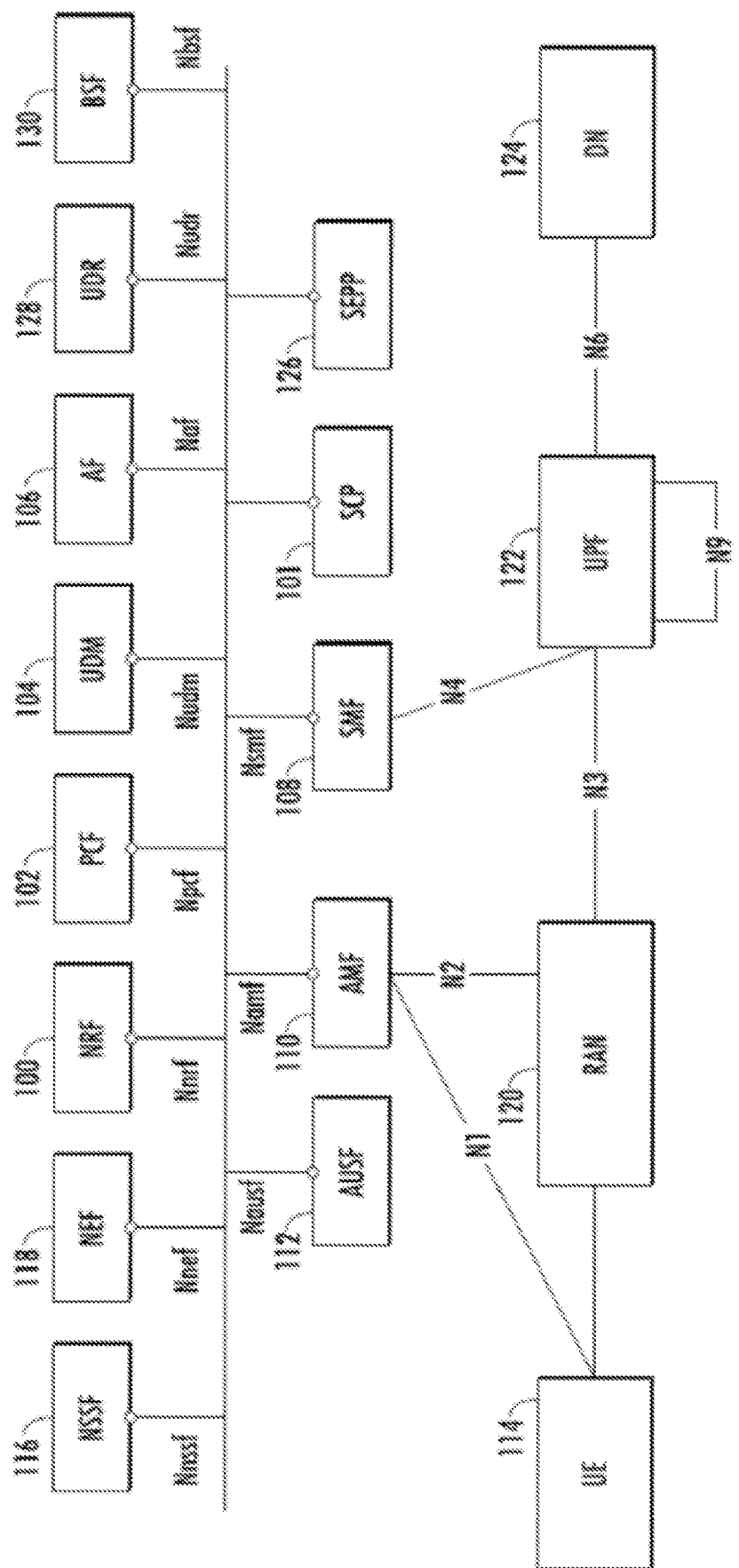
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As stated above, one problem that can occur in 5G and other types of networks is that NF client identity private keys and public key certificates can be stolen and used without authorization to obtain a TLS certificate of an NF. The TLS certificate can then be used to impersonate the NF and gain unauthorized access to other NFs and information in the network.

According to an aspect of the subject matter described herein, rather than issuing the TLS certificate to an entity that presents only a request with a signature generated using a CMP client identity private key and a public key certificate, an NRF-issued access token, such as an OAuth 2.0 access token, may be required as an additional credential before a TLS certificate of an NF is issued. In the context of 5G communications networks, the NF service consumer functions as the OAuth 2.0 resource client, the NF service producer functions as the OAuth 2.0 resource server, and the NRF functions as the authorization server. Thus, an NF service consumer seeking to access a service provided by an NF service producer signals with the NRF to obtain an access token to access the resource provided by the NF service producer. After the NF service consumer obtains the access token from the NRF, the NF service consumer sends a service request to the NF service producer, where the service request includes the access token. The NF service producer validates the access token and provides access to the service requested by the NF service consumer. Rather than simply using the OAuth 2.0 access token to allow consumer NFs to access services provided by producer NFs, the subject matter described herein includes using the OAuth 2.0 access token of an NF as a mandatory credential for a requesting entity to obtain a TLS certificate of the NF. By providing the OAuth 2.0 access token in addition to the signature generated using the CMP client identity private key and the public key certificate in a CMP certificate request, the NF utilizes multi-factor authentication (MFA), which enhances the security the CMP protocol. In the examples described herein, the multi-factor authentication is two-factor authentication, i.e., validation of the OAuth 2.0 access token being the first factor, and validation of the signature generated using the CMP client identity private key being the second factor.

The NRF-issued access token may be a mandatory credential when an entity requests renewal of a TLS certificate of an NF. Using the NRF-issued access token as an additional mandatory credential decreases the chance that a hacker can obtain a TLS certificate for a registered NF, even if the CMP client identity private key and public key certificate are compromised. In one example, a CA proxy is provided in front of the CMP CA to validate that the NRF-issued OAuth 2.0 access token for the NF whose TLS certificate is being requested is embedded in the HTTP-based CMP certificate renewal request. To successfully renew a TLS certificate, the requesting entity needs to provide the NRF-issued OAuth 2.0 access token at the time of TLS certificate renewal. The CA proxy queries the NRF to check whether the NF is registered or not. If the NF is registered, the CA proxy validates the OAuth 2.0 access token using the NRF public key corresponding to the private key used for token generation. The certificate request must contain the NRF-issued OAuth 2.0 access token of the NF to successfully retrieve the TLS certificate of the NF.

3GPP TS 33.501 Section 13.3.1 specifies the usage of mutual authenticated TLS and HTTPS and further using identities embedded in the end entity certificates for authentication and policy checks. If a hacker can gain access to the CMP client identity private key and public key certificate, the hacker can obtain a TLS certificate issued in the name of the NF and can use the TLS certificate to impersonate the NF to the NRF or to other NFs.

The TLS certificate and private key may be stolen by a hacker and used for SBI requests (e.g., a request for the NFRegister service operation). TLS/public key infrastructure (PKI) provides the concept of a revocation using a certificate revocation list (CRL) or an online certificate status protocol (OCSP) for a certificate that is stolen with the owner's knowledge. However, no mitigation is available at the transport layer when the TLS certificate and private key are stolen without the owner's knowledge. Even using a CRL and the OCSP, the owner must notify the authorities of a certificate theft, and the authorities must update their database for the theft and mark a certificate as stolen. There is a time delay between theft and revocation of the certificate, providing an opportunity to the hacker to perform an attack. The subject matter described herein mitigates the problem of certificates stolen without the owner's knowledge. The suggested solution is also useful when the certificate is stolen, but there is a delay in revoking the stolen certificate.

Figure 2:
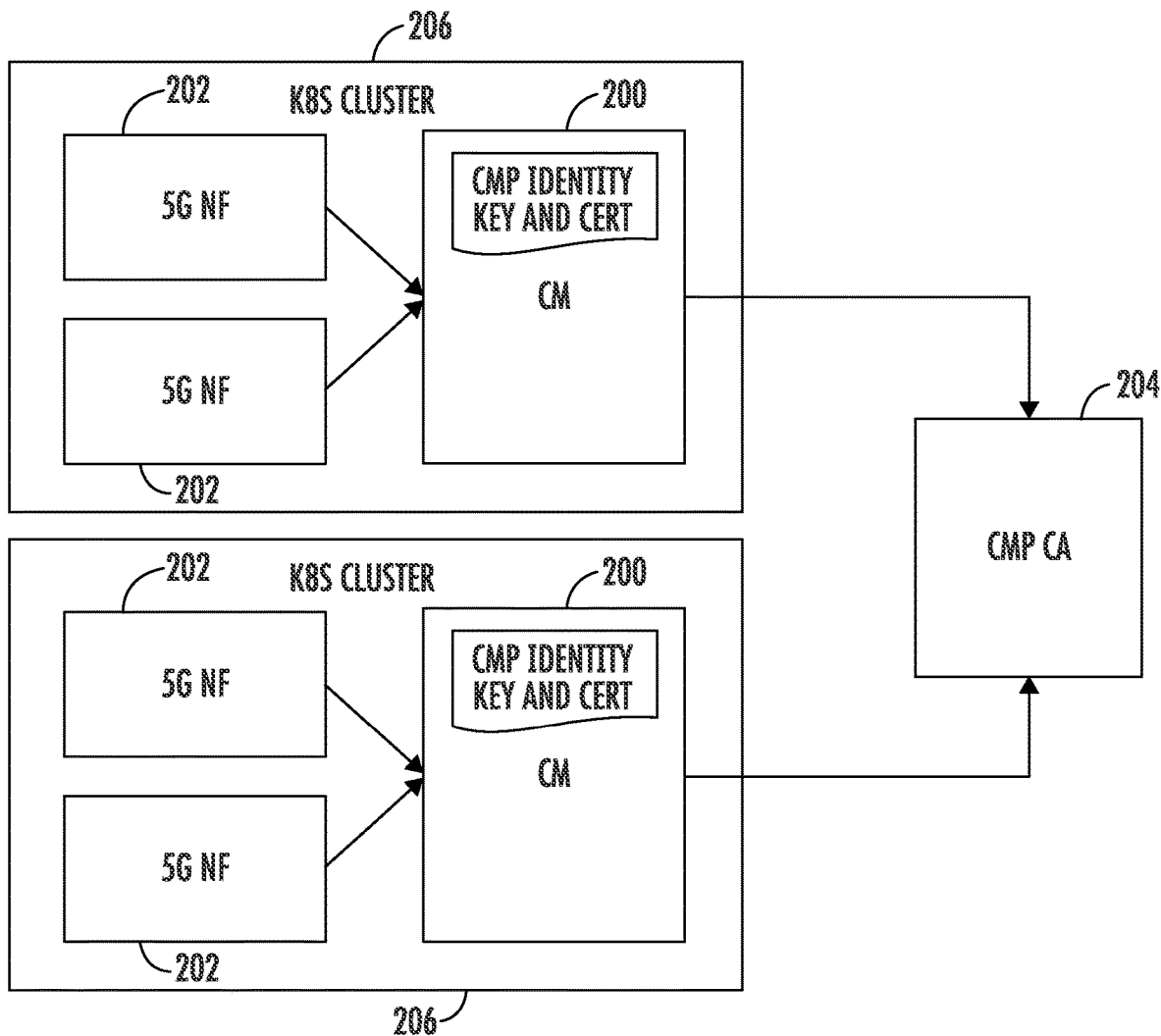
FIG. 2 is a network diagram illustrating an example security architecture for certificate management for 5G NFs.

In one possible security architecture, a certificate manager (CM) can be used for automated certificate management for NFs. FIG. 2 illustrates an example of such an architecture, in FIG. 2, a CM 200 is configured with a CMP client identity private key and CMP public key certificate for one or more NFs 202. The CMP client identity private key and CMP public key certificate are used for authentication with a CMP certificate authority (CA) 204. The communication between 5G NFs 202 and CMs 200 may be secured using a service mesh or other similar solution. In the example architecture illustrated in FIG. 2, NFs 202 and CMs 200 are implemented in Kubernetes clusters 206.

Figure 3:
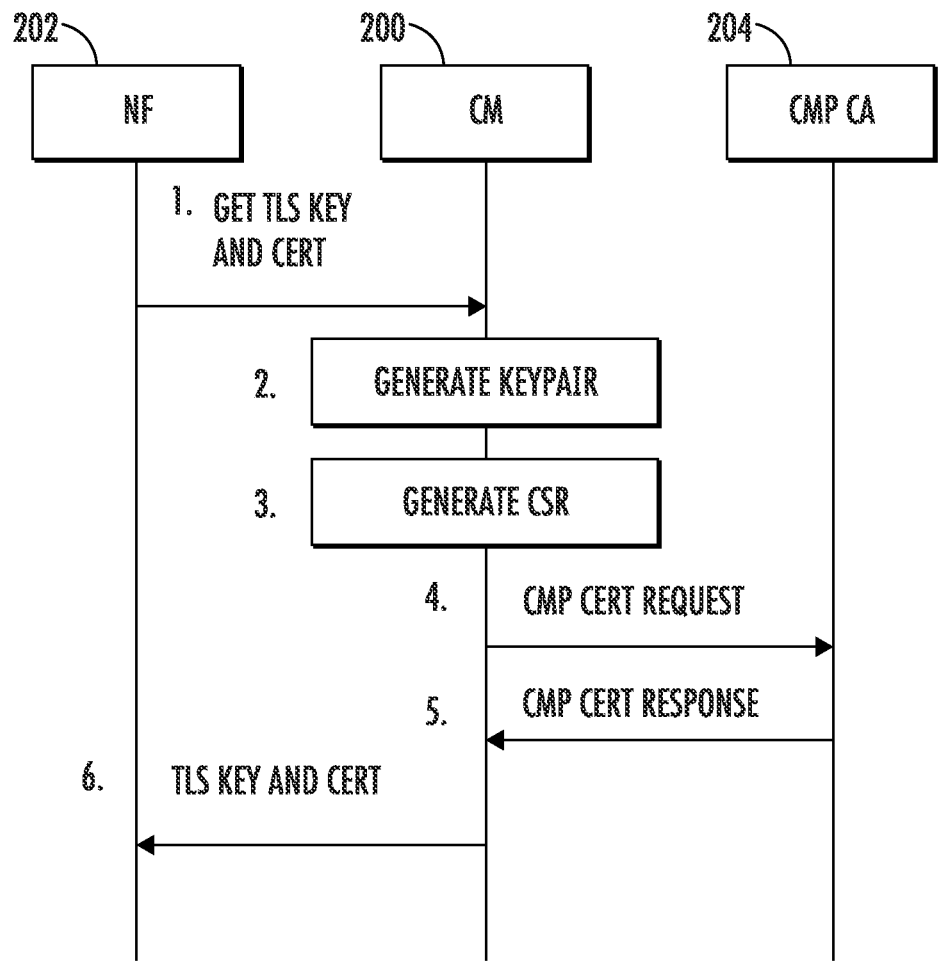
FIG. 3 is a message flow diagram illustrating exemplary messages exchanged in obtaining a TLS certificate using the security architecture illustrated in FIG. 2.

FIG. 3 illustrates exemplary messages exchanged in obtaining a TLS certificate using the security architecture illustrated in FIG. 2. Referring to FIG. 3, in step 1, NF 202 sends a request to CM 200 to obtain a TLS key and certificate. In step 2, CM 200 generates a key pair for the TLS certificate request and, in step 3, generates the CMP certificate request to send to CA 204. The keypair generated by CM 200 includes the CMP client identity private key and public key for NF 202. CM 200 uses a signature generated using the CMP client identity private key for PKI message protection. In step 4, CM 200 sends a CMP certificate request to CA 204. The CMP certificate request includes the public key certificate (containing the public key of NF 202 and key metadata). The CMP certificate request also includes a signature generated using the CMP client identity private key. In step 5, CA 204 validates the request using the public key in the request to validate the signature and generates a certificate response including the TLS key and certificate of NF 202 and sends the response to CM 200. In step 6, CM 200 sends the TLS key and certificate to NF 202. A hacker having access to the CMP client identity private key can impersonate CM 200 and obtain an NF TLS certificate from CA 204.

Figure 4:
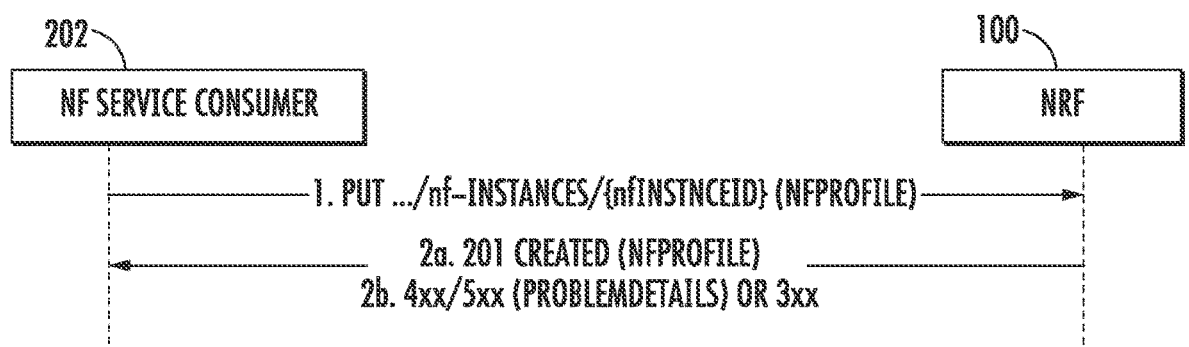
FIG. 4 is a message flow diagram illustrating exemplary messages exchanged in the NFRegister service operation.

As indicated above, it is desirable to prevent a hacker from impersonating a registered NF. Registered NFs are those that are registered with the NRF using the NFRegister service operation. The NFRegister service operation is described in 3GPP TS 29.510 Section 5.2.2.2.1. FIG. 4 illustrates exemplary messages exchanged in the NFRegister service operation. Referring to FIG. 4, in line 1, an NF service consumer 202 sends an NFRegister request to NRF 100. The NFRegister request includes the NF profile of NF service consumer 202. The NFRegister request is also secured with the TLS certificate of NF service consumer 202. NRF 100 receives the NFRegister request, validates the TLS certificate, processes the request, and if the processing is successful, responds as indicated in line 2a with 201 Created message. The 201 Created message includes the NF profile of the registering NF. If processing of the NF register request is not successful, NRF 100 responds as indicated in line 2b with an NF 4xx or 5xx message specifying problem details.

Figure 5:
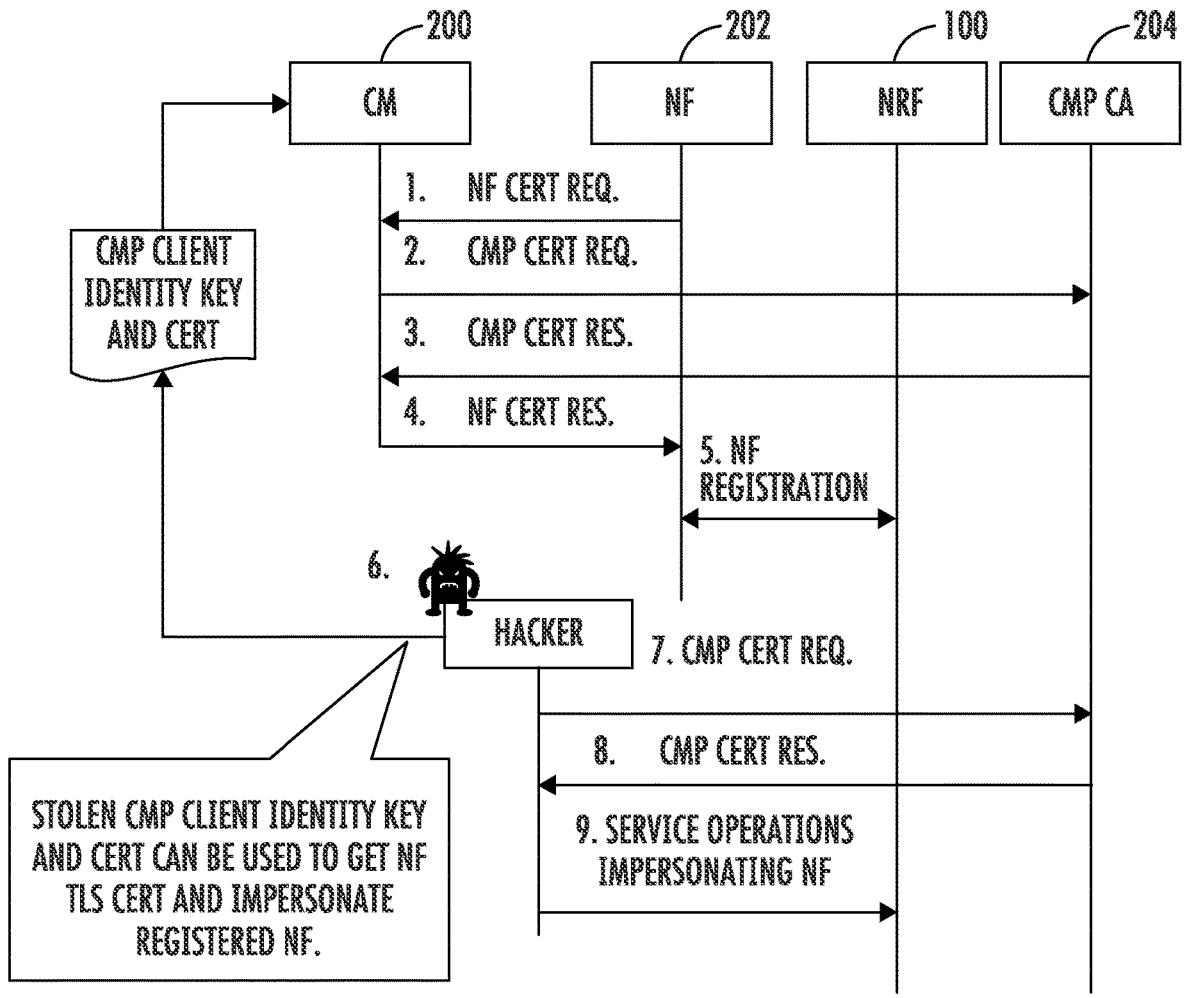
FIG. 5 is a message flow diagram illustrating exemplary messages exchanged when a hacker uses a stolen CMP client identity private key and certificate to obtain a TLS certificate of an NF.

FIG. 5 is a message flow diagram illustrating exemplary messages exchanged when a hacker uses a stolen CMP client identity private key and public key certificate to obtain a TLS certificate of an NF. Referring to FIG. 5, in line 1, NF 202 sends an NF certificate request to CM 200. In line 2, CM 200 sends the CMP certificate request to CMP CA 204. In line 3, CMP CA 204 sends the CMP certificate response to CM 200. The CMP certificate response includes the TLS certificate of NF 202. line 4, CM 200 provides the TLS certificate to NF 202 in an NF certificate response message. In line 5, NF 202 registers with NRF 100 using the NFRegister service operation illustrated in FIG. 4. The NFRegister service operation is secured using the TLS certificate of NF 202.

In line 6, a hacker obtains the CMP client identity private key and public key certificate of NF 202. In line 7, the hacker sends a CMP certificate request to CMP CA 204. In line 8 CMP CA 204 responds with a CMP certificate response including the TLS certificate of NF 202. In line 9, the hacker initiates service operations impersonating NF 202 using the stolen TLS certificate.

To reduce the likelihood of a hacker successfully obtaining an NF TLS certificate, the subject matter described herein includes a CA proxy for intercepting CMP requests and mandating NRF-issued OAuth 2.0 access token for TLS certificate renewal. A hacker needs an NRF-issued OAuth 2.0 access token in addition to the CMP client identity private key and certificate for requesting TLS certificate renewal. The NF needs to provide the NRF-issued OAuth 2.0 access token for TLS certificate renewal or creation. If the NF is not already registered, the NRF-issued OAuth 2.0 access token is not needed for the TLS certificate request. In one implementation of the subject matter described herein, direct access to CMP CA is only available to the CA proxy.

Figure 6A:
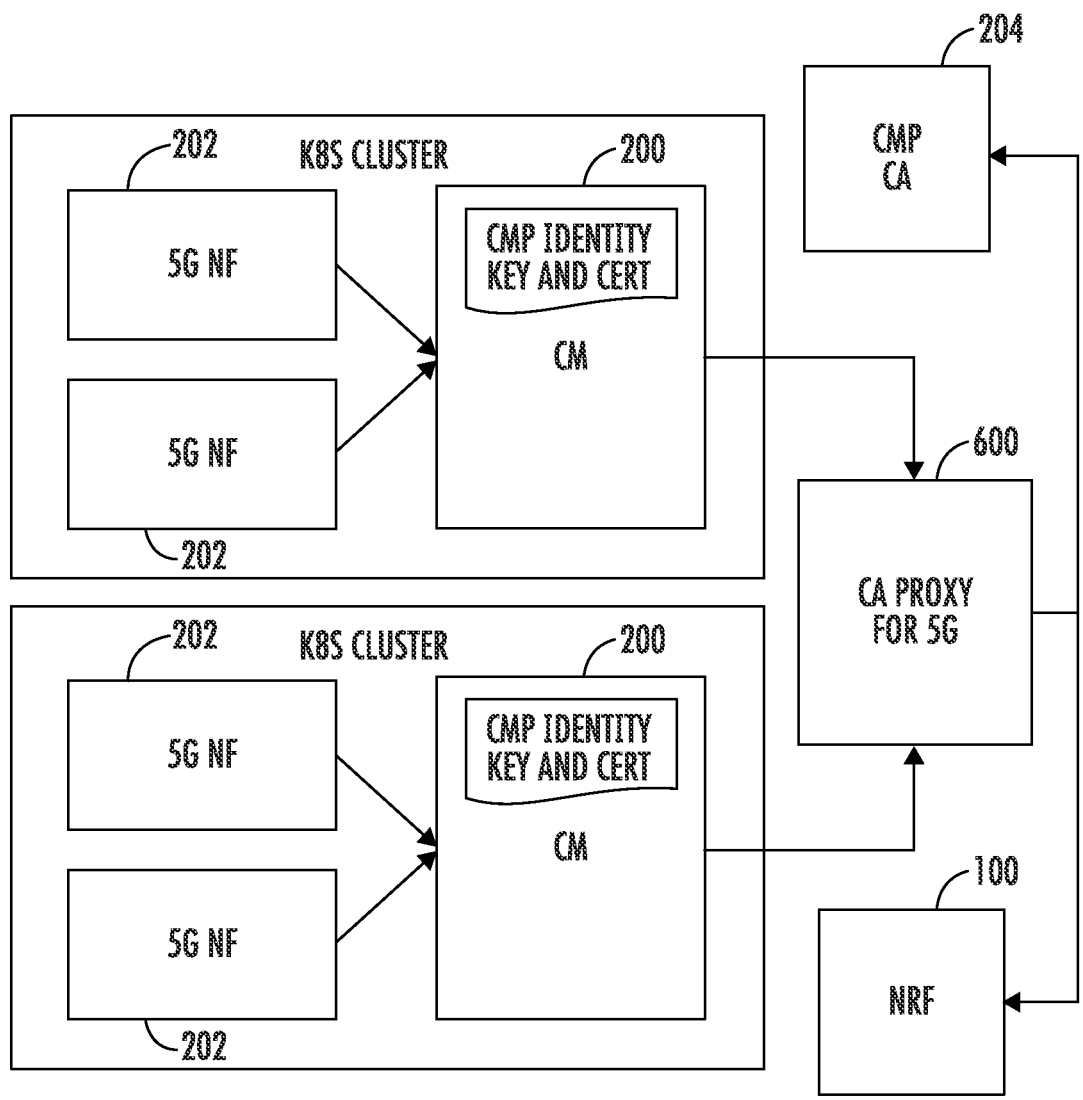
FIG. 6A is a network diagram illustrating one example of a security architecture in which a CA proxy intercepts a CMP certificate request and requires an NRF-issued OAuth 2.0 access token for a registered NF before providing a TLS certificate of the NF to a querying entity.

FIG. 6A illustrates one example of a security architecture in which a CA proxy intercepts a CMP certificate request and requires an NRF-issued OAuth 2.0 access token for a registered NF before providing a TLS certificate of the NF to a querying entity. Referring to FIG. 6A, CMs 200 issue CMP certificate requests to CAs 204 on behalf of 5G NFs 202. The certificate requests each include an NF public key certificate, and each is protected by a CMP client identity private key associated with the NF. In addition, if a certificate request is for an NF that has previously registered with NRF 100, the certificate request also includes an OAuth 2.0 access token. CA proxy 600 receives or intercepts the certificate request, checks whether the NF is registered with NRF 100 and, in response to determining that an NF is registered with NRF, checks the certificate request for the presence of an OAuth 2.0 access token for the registered NF. If the certificate request includes an OAuth 2.0 access token for the registered NF (along with the public key certificate of the NF), CA proxy 600 allows the request to pass to CMP CA 204. CMP CA 204 renews a TLS certificate for the NF and provides the TLS certificate to the requesting CM in a TLS certificate response.

If the NF is registered and the CMP certificate request does not include the OAuth 2.0 access token of the NF, CA proxy 600 may perform a network security action, such as preventing further processing of the CMP certificate request by CA 204 by dropping the request.

Figure 6B:
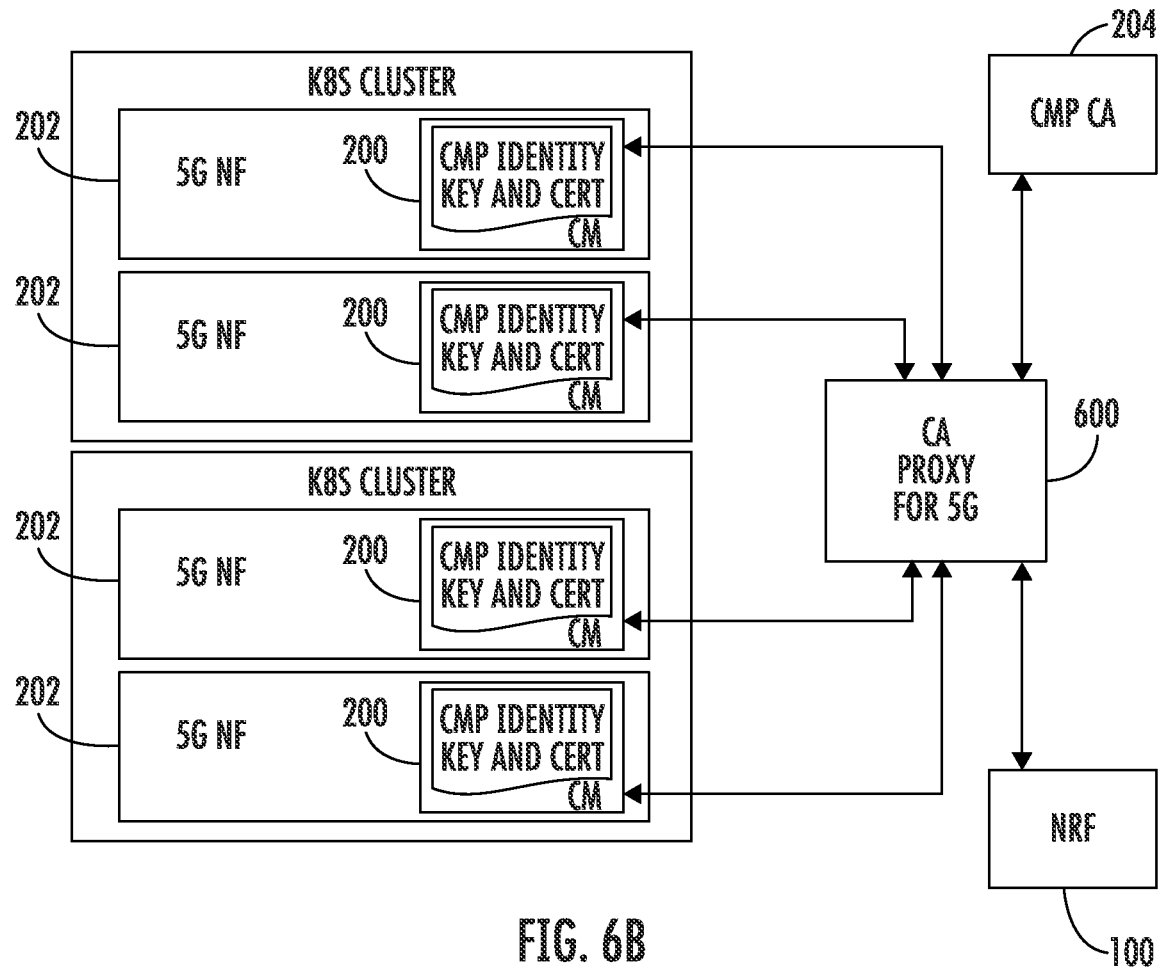
FIG. 6B is a network diagram illustrating an alternate security architecture in which a CA proxy intercepts a CMP certificate request and requires an NRF-issued OAuth 2.0 access token for a registered NF before providing a TLS certificate of the NF to a querying entity.

FIG. 6B illustrates an alternate security architecture in which a CA proxy intercepts a CMP certificate request for a registered NF and requires an NRF-issued OAuth 2.0 access token of the NF before providing a TLS certificate of the NF to a querying entity. In the architecture in FIG. 6B, each NF 202 includes its own CM 200 and communicates directly with CA proxy 600. CA proxy 600 operates the same as illustrated in FIG. 6A to validate CMP certificate requests based on the presence of NRF-issued OAuth 2.0 access tokens.

Figure 6C:
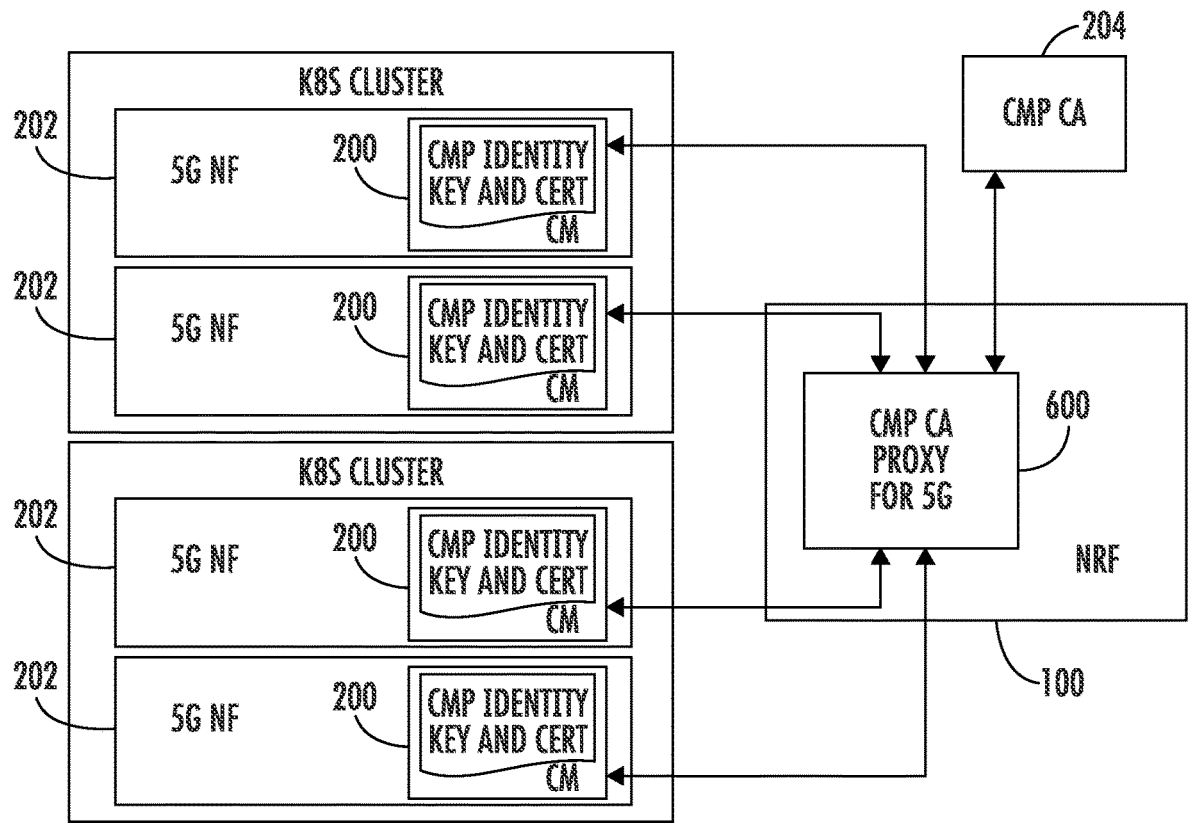
FIG. 6C is a network diagram illustrating yet another alternate security architecture in which a CA proxy intercepts a CMP certificate request and requires an NRF-issued OAuth 2.0 access token for a registered NF before providing a TLS certificate of the NF to a querying entity.

FIG. 6C illustrates yet another alternate security architecture in which a CA proxy intercepts a CMP certificate request and requires an NRF-issued OAuth 2.0 access token for a registered NF before providing a TLS certificate of the NF to a querying entity. In the architecture in FIG. 6C, like the architecture in FIG. 6B, each NF 202 includes its own CM 200 and communicates directly with CA proxy 600. In addition, rather than being separate from NRF 100, CA proxy 600 is a component of NRF 100. CA proxy 600 operates the same as illustrated in FIG. 6A to validate CMP certificate requests based on the presence of NRF-issued OAuth 2.0 access tokens, except rather than querying a separate NRF, CA proxy 600 illustrated in FIG. 6C can access the internal NF profiles database of NRF 100 to determine whether an NF is registered and can also obtain the OAuth 2.0 access token of the registered NF from an internal database of the NRF.

Figure 7:
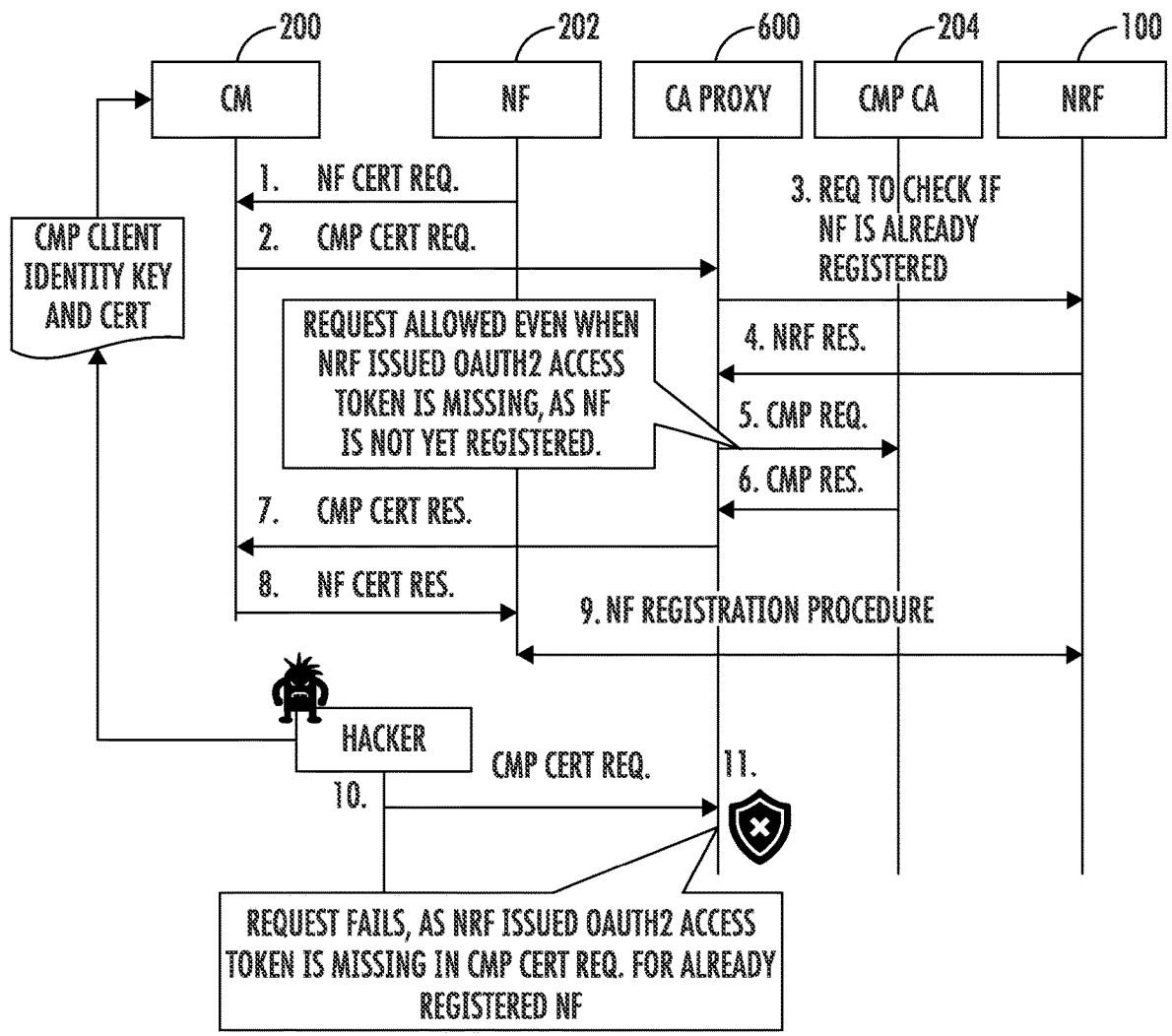
FIG. 7 is a message flow diagram illustrating exemplary messages exchanged using a CMP CA proxy to validate CMP certificate requests.

FIG. 7 is a message flow diagram illustrating exemplary messages exchanged using a CMP CA proxy to validate CMP certificate requests. Referring to FIG. 7, in line 1, NF 202 sends an NF certificate request to CM 200. In line 2, CM 200 sends a CMP certificate request to CA 204. CMP CA proxy 600 intercepts the request, and, in line 3 queries NRF 100 to determine whether the NF identified in the CMP certificate request is registered or not. The query to determine whether the NF is registered or not may in one example be an NFDiscover request. In line 4, NRF 100 responds indicating that NF 202 is not registered. Because NF 202 is not registered, in line 5, CA proxy 600 forwards or allows the CMP certificate request to pass to CMP CA 204. CMP CA 204 renews the TLS certificate for NF 202 and, in line 6, sends CMP certificate response including the TLS certificate of NF 202 to CMP CA proxy 600. In line 7, CMP CA proxy 600 sends the CMP certificate response to CM 200. In line 8, CMP CA 204 sends the NF certificate response to NF 202.

In line 9, NF 202 registers with NRF 100 using the NFRegister service operation. In line 10, a hacker who has obtained the CMP client identity private key and public key certificate of NF 202 sends a CMP certificate request to CA 204. The CMP certificate request includes the public key certificate of NF 202 but does not include the OAuth 2.0 access token of NF 202. CMP CA proxy 600 intercepts the CMP certificate request, determines that the request is for the TLS certificate of an already registered NF, determines that the request does not include an OAuth 2.0 access token, and, in step 11, performs a network security action, such as blocking the request.

Figure 8:
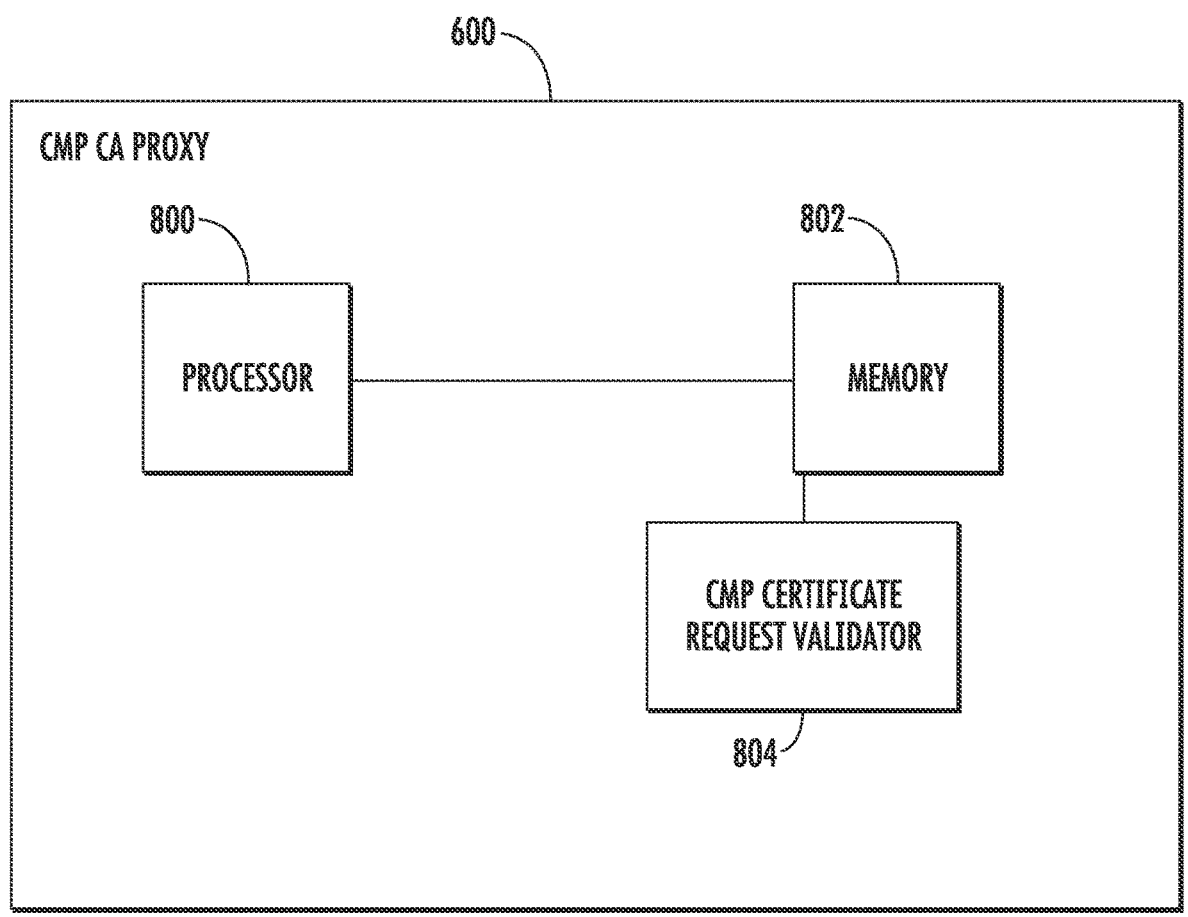
FIG. 8 is a block diagram illustrating an exemplary architecture for CMP CA proxy.

FIG. 8 is a block diagram illustrating an exemplary architecture for CMP CA proxy 600. Referring to FIG. 8, CMP CA proxy 600 includes at least one processor 800 and a memory 802. CMP CA proxy 600 may also include a CMP certificate request validator 804 for performing the steps described herein for validating CFP certificate requests before allowing the request to proceed to CMP CA 204. CMP certificate request validator 804 may be implemented using computer executable instructions stored in memory 802 and executed by processor 800. CMP CA proxy 600 may be a stand-alone entity or may be a component of an NRF.

CMP CA proxy 600 may be registered as a custom NF with NRF 100. Registration of CMP CA proxy 600 with NRF 100 may be needed for CMP CA proxy to be permitted to query NRF 100 to determine whether an NF is registered or not. The NRF-issued OAuth 2.0 access token for CA proxy 600 may be scoped to CA proxy services.

Figure 9:
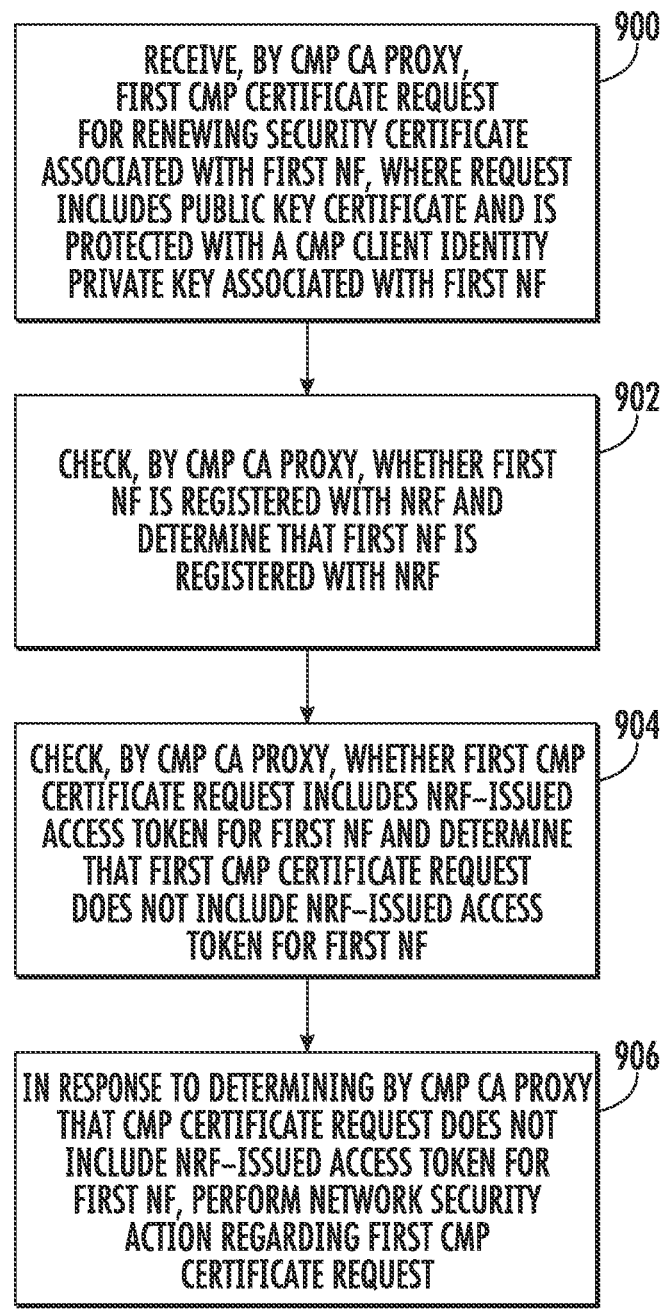
FIG. 9 is a flow chart illustrating an exemplary process for protecting against unauthorized use of CMP client identity private keys and CMP public key certificates associated NFs.

FIG. 9 is a flow chart illustrating an exemplary process for protecting against unauthorized use of CMP client identity private keys and CMP public key certificates associated with NFs. Referring to FIG. 9, in step 900, the process includes receiving, by a CMP certificate authority (CA) proxy, a first CMP certificate request for renewing a security certificate associated with a first NF, the CMP certificate request including a public key certificate associated with the first NF. For example, CMP CA proxy 600 may receive a CMP certificate request requesting a TLS or other security certificate of an NF. If the request is legitimate, the request may originate from a CM associated with the first NF. If the request is not legitimate, the request may originate from a hacker who has stolen the CMP client identity private key and public key certificate associated with the first NF.

In step 902, the process further includes checking, by the CMP CA proxy, whether the first NF is registered with an NF repository function (NRF) and determining that the first NF is registered with the NRF. For example, CMP CA proxy 600 may query the NRF, e.g., using an NFDiscover request or other type of query message, to determine whether the first NF is registered with the NRF. CMP CA proxy 600 may determine that the first NF is registered with the NRF by receiving an NFDiscover or other response message that indicates that the first NF is registered with the NRF.

In step 904, the process further includes, in response to determining, by the CMP CA proxy that the first NF is registered with the NRF, checking, by the CMP CA proxy whether the first CMP certificate request includes an NRF-issued access token for the first NF and determining that the CMP certificate request does not include the NRF-issued access token for the first NF. For example, CMP CA proxy 600 may determine whether the CMP certificate request includes an OAuth 2.0 access token, in addition to the public key certificate of the first NF and a signature generated using the CMP client identity private key associated with the first NF. CMP CA proxy 600 may extract the OAuth 2.0 access token from the request and validate the OAuth2.0 access token using the public key of the NRF. In step 904, CMP CA proxy 600 determines that the OAuth 2.0 access token is not present in the CMP certificate request.

In step 906, the process further includes, in response to determining, by the CMP CA proxy that the first CMP certificate request does not include the NRF-issued access token for the first NF, performing a network security action regarding the first CMP certificate request. For example, CMP CA proxy 600 may prevent the CMP CA request from reaching the CA and thereby prevent the originator of the CMP certificate request from obtaining the TLS certificate of the first NF.

Although the examples described above relate to reducing the likelihood of a hacker successfully impersonating an NF to renew a TLS certificate of the NF, the subject matter described herein is not limited to protecting against unauthorized renewals of TLS certificates. The same protections and protocol can be used to reduce the likelihood of the hacker successfully renewing or obtaining a client credentials assertion (CCA) certificate associated with the NF. The message flows for protecting against renewal of CCA certificates without authorization are similar to those described above except that the CMP certificate request would identify the request as a request for a CCA certificate instead of a TLS certificate. The OAuth 2.0 access token would be a mandatory parameter of the CMP certificate request for obtaining the CCA certificate of an NF.

Exemplary advantages of the subject matter described herein include that the ability to prevent hackers from obtaining an NF TLS certificate using a stolen CMP client identity private key and public key certificate. This further prevents hacker from impersonating an NF to 5G entities which rely on transport-based security mechanism to authenticate NFs. The CMP CA proxy can be used to validate CMP certificate requests for any NF, including those illustrated in FIG. 1. The CMP CA proxy functionality of validating certificate requests using NRF-issued OAuth 2.0 access token is extensible to enhance security/protection for certificate management protocols that secure types of certificates other than TLS certificates which may be used in future 5G or subsequent generation deployments. The CMP CA proxy can be used in combination with any 5G or other generation network function, including, but not limited to the NRF, SCP, SEPP, PCF, BSF, NEF, NSSF, UDR, equipment identity register (EIR), or network data analytics function (NWDAF).

The disclosure of each of the following references is hereby incorporated herein by reference in its entirety.

REFERENCES

1. $3^{rd}$ Generation Partnership Project; Technical Specification Group Services and System Aspects for the 5G System (5GS); Stage 2; (Release 17) 3GPP TS 23.501 V17.7.0 (2022-12)
2. $3^{rd}$ Generation Partnership Project; Technical Specification Group Services and System Aspects; Procedures for the 5G System (5GS); Stage 2 (Release 17) 3GPP TS 23.502 V17.7.0 (2022-12)
3. $3^{rd}$ Generation Partnership Project; Technical Specification Group Core Network and Terminals; 5G System; Network Function Repository Services; Stage 3 (Release 18) 3GPP TS 29.510 V18.1.0 (2022-12)
4. $3^{rd}$ Generation Partnership Project; Technical Specification Group Core Network and Terminals; 5G System; Technical Realization of Service Based Architecture; Stage 3 (Release 18) 3GPP TS 29.500 V18.0.0 (2022-12)
5. $3^{rd}$ Generation Partnership Project; Technical Specification Group Core Network and Terminals; 5G System; Principles and Guidelines for Services Definition; Stage 3 (Release 18) 3GPP TS 29.501 V18.0.0 (2022-12)
6. $3^{rd}$ Generation Partnership Project; Technical Specification Group Services and System Aspects; Security architecture and procedures for 5G system (Release 18) 3GPP TS 33.501 V18.0.0 (2022-12)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for protecting against unauthorized use of certificate management protocol (CMP) client identity private keys and CMP public key certificates associated with network functions (NFs), the method comprising:

receiving, by a CMP certificate authority (CA) proxy, a first CMP certificate request for renewing a security certificate associated with a first NF, the CMP certificate request including a public key certificate associated with the first NF and is protected by a CMP client identity private key associated with the first NF, wherein receiving the first CMP certificate request includes receiving the first CMP certificate request from a hacker impersonating the first NF;

checking, by the CMP CA proxy, whether the first NF is registered with an NF repository function (NRF) and determining that the first NF is registered with the NRF;

in response to determining, by the CMP CA proxy that the first NF is registered with the NRF, determining, by the CMP CA proxy, whether the first CMP certificate request includes an OAuth 2.0 access token of the first NF that consumer NFs present to the first NF to access services provided by the first NF; and in response to determining, by the CMP CA proxy, that the first CMP certificate request does not include the OAuth 2.0 access token of the first NF, performing a network security action regarding the first CMP certificate request, wherein performing the network security action for the first CMP certificate request includes preventing a CMP CA from providing the security certificate to the hacker by blocking the first CMP certificate request-from being sent by the CMP CA proxy to the CMP CA.

2. The method of claim 1 wherein receiving the first CMP certificate request at the CMP CA proxy includes receiving the first CMP certificate request at the CMP CA proxy that is a component of the NRF or at the CMP CA proxy that is separate from the NRF.

3. The method of claim 1 wherein receiving the first CMP certificate request includes intercepting the first CMP certificate request.

4. The method of claim 1 wherein receiving the first CMP certificate request includes receiving the first CMP certificate request for a transport layer security (TLS) or a client credentials assertion (CCA) certificate of the first NF.

5. The method of claim 1 comprising:

receiving, by the CMP CA proxy, a second CMP certificate request for renewing a security certificate associated with a second NF, the request including a public key certificate associated with the second NF and is protected by a CMP client identity private key associated with the second NF;

checking, by the CMP CA proxy, whether the second NF is registered with the NRF and determining that the second NF is not registered with the NRF; and in response to determining that the second NF is not registered with the NRF, allowing processing of the second CMP certificate request.

6. The method of claim 5 wherein allowing processing of the second CMP certificate request includes providing the second CMP certificate request to the CMP CA, at the CMP CA, generating a CMP certificate response including the security certificate associated with the second NF, and forwarding the CMP certificate response to an originator of the second CMP certificate request.

7. The method of claim 1 comprising:

transmitting, by a second NF and to the CMP CA proxy, a second CMP certificate request for renewing a second security certificate associated with the second NF, the second CMP certificate request including a public key certificate and an NRF-issued OAuth 2.0 access token associated with the second NF;

receiving, by the CMP CA proxy, the second CMP certificate request;

checking, by the CMP CA proxy, whether the second NF is registered with the NRF and determining that the second NF is registered with the NRF;

in response to determining, by the CMP CA proxy that the second NF is registered with the NRF, checking, by the CMP CA proxy whether the second CMP certificate request includes the NRF-issued OAuth 2.0 access token associated with the second NF and determining that the second CMP certificate request includes the NRF-issued OAuth 2.0 access token associated with the second NF; and in response to determining, by the CMP CA proxy, that the second CMP certificate request includes the NRF-issued OAuth 2.0 access token associated with the second NF, allowing processing of the second CMP certificate request by forwarding the second CMP certificate request to a CMP CA proxy.

8. A system for protecting against unauthorized use of certificate management protocol (CMP) client identity private keys and CMP public key certificates associated with network functions (NFs), the system comprising:

a CMP certificate authority (CA) proxy including at least one processor and a memory; and a CMP certificate request validator implemented by the at least one processor for:

receiving a first CMP certificate request for renewing a security certificate associated with a first NF, the CMP certificate request including a public key certificate associated with the first NF and is protected by a CMP client identity private key associated with the first NF, wherein receiving the first CMP certificate request includes receiving the first CMP certificate request from a hacker impersonating the first NF;

checking whether the first NF is registered with an NF repository function (NRF) and determining that the first NF is registered with the NRF;

in response to determining that the first NF is registered with the NRF, determining whether the first CMP certificate request includes an OAuth 2.0 access token of the first NF that consumer NFs present to the first NF to access services provided by the first NF; and in response to determining that the first CMP certificate request does not include the OAuth 2.0 access token of the first NF, performing a network security action regarding the first CMP certificate request, wherein performing the network security action comprises preventing a CMP CA from providing the security certificate to the hacker by blocking the first CMP certificate request from being sent by the CMP CA proxy to the CMP CA.

9. The system of claim 8 wherein the CMP CA proxy comprises a component of the NRF or is separate from the NRF.

10. The system of claim 8 wherein the CMP CA proxy is configured to receive the first CMP certificate request by intercepting the first CMP certificate request.

11. The system of claim 8 wherein the security certificate comprises a transport layer security (TLS) or a client credentials assertion (CCA) certificate of the first NF.

12. The system of claim 8 wherein the CMP certificate request validator is configured to:

receive a second CMP certificate request for renewing a security certificate associated with a second NF, the request including a public key certificate associated with the second NF and is protected by a CMP client identity private key associated with the second NF;

check whether the second NF is registered with the NRF and determine that the second NF is not registered with the NRF; and in response to determining that the second NF is not registered with the NRF, allow processing of the second CMP certificate request.

13. The system of claim 8 comprising a second NF for transmitting, to the CMP CA proxy, a second CMP certificate request for renewing a second security certificate associated with the second NF, the second CMP certificate request including a public key certificate associated with the second NF, is protected by a CMP client identity private key associated with the second NF, and includes an NRF-issued OAuth 2.0 access token associated with the second NF, wherein the CMP certificate request validator is configured to:

receive the second CMP certificate request;

check whether the second NF is registered with the NRF and determining that the second NF is registered with the NRF;

in response to determining that the second NF is registered with the NRF, check whether the second CMP certificate request includes the NRF-issued OAuth 2.0 access token associated with the second NF and determine that the second CMP certificate request includes the NRF-issued OAuth 2.0 access token associated with the second NF; and in response to determining that the second CMP certificate request includes the NRF-issued OAuth 2.0 access token associated with the second the second NF, allowing processing of the second CMP certificate request by forwarding the second CMP certificate request to the CMP CA.

14. A non-transitory computer readable medium having stored thereon executable instructions that when executed by a processor of a computer control the computer to perform steps comprising:

receiving, by a certificate management protocol (CMP) certificate authority (CA) proxy, a first CMP certificate request for renewing a security certificate associated with a first network function (NF), the CMP certificate request including a public key certificate associated with the first NF and is protected by a CMP client identity private key associated with the first NF, wherein receiving the first CMP certificate request includes receiving the first CMP certificate request from a hacker impersonating the first NF;

checking, by the CMP CA proxy, whether the first NF is registered with an NF repository function (NRF) and determining that the first NF is registered with the NRF;

in response to determining, by the CMP CA proxy that the first NF is registered with the NRF, determining whether the first CMP certificate request includes an OAuth 2.0 access token of the first NF that consumer NFs present to the first NF to access services provided by the first NF; and in response to determining, by the CMP CA proxy, that the first CMP certificate request does not include the OAuth 2.0 access token of the first NF, performing a network security action regarding the first CMP certificate request, wherein performing the network security action comprises preventing a CMP CA from providing the security certificate to the hacker by blocking the first CMP certificate request-from being sent by the CMP CA proxy to the CMP CA.

* * * * *